RE 25480

Aug. 26, 1958     C. H. KEY ET AL     2,849,074

BATTERY RETAINER MEANS

Filed July 12, 1956

INVENTORS.
Cleo H. Key,
Ralph K. Merkle &
Shirrell C. Richey

BY L. D. Burch

ATTORNEY.

United States Patent Office 2,849,074
Patented Aug. 26, 1958

2,849,074
BATTERY RETAINER MEANS

Cleo H. Key, Dearborn, Ralph H. Merkle, Milford, and Shirrell C. Richey, Huntington Woods, Mich., assignors to General Motors Corporation, Detroit, Mich., a corporation of Delaware Application July 12, 1956, Serial No. 597,550

4 Claims. (Cl. 180—68.5)

This invention relates to means for holding a battery member or the like within a receiving tray member.

Automotive and other vehicle batteries which are housed within engine compartments with other accessory items are required to be mounted within an unobstructive space in a secure manner and to be readily accessible for service and replacement. It is desirable that such battery retainer means be relatively inexpensive to manufacture, be easily disassembled when a battery is to be removed, and at the same time provide secure shakeproof mounting of the battery as installed.

It is here proposed to provide a battery retainer means which is simple in construction, includes few parts, is inexpensive to manufacture, easily assembled and readily applied and removed. The proposed retainer means includes a pair of spaced angle bracket members for engaging opposite edges of the battery case and which are secured to a rod member extended therebetween and having its ends looped to receive tie rods engaged to the battery receiving tray. Threaded fastener means engaged with the ends of the tie rods draw the retainer assembly towards the tray member and engage the battery member securely within the receiving tray.

Figure 1:
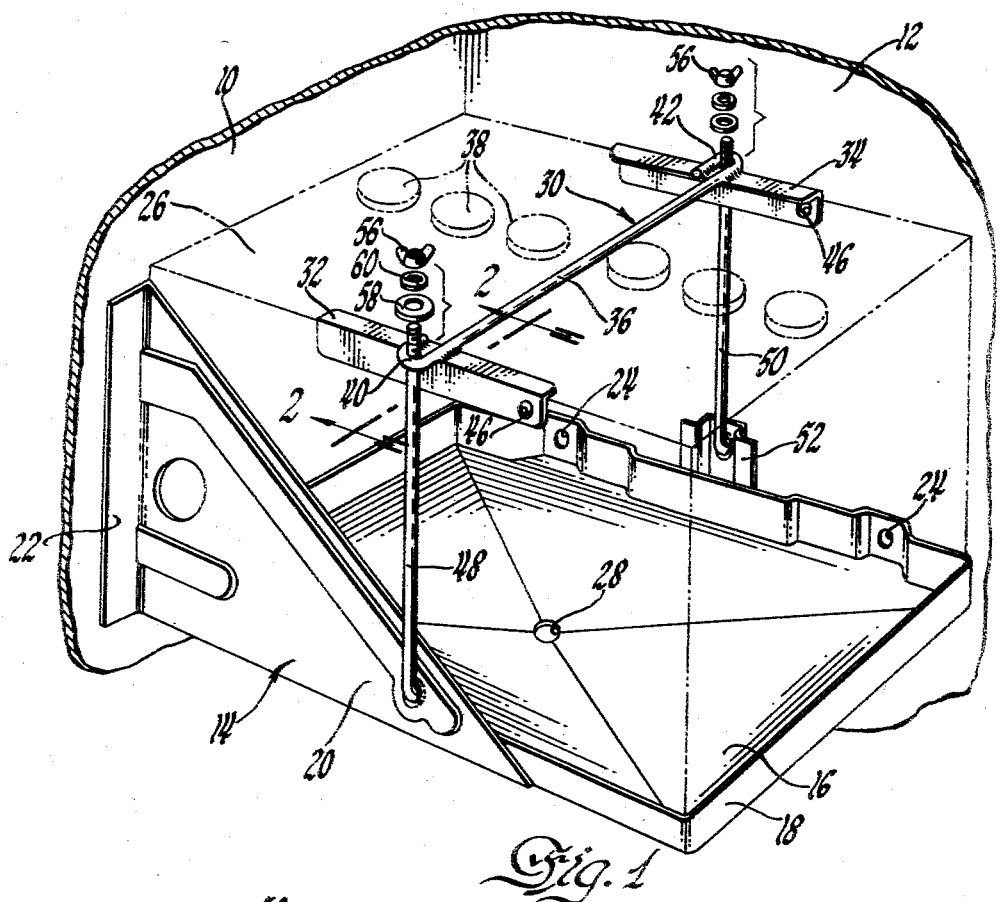
Figure 1 is a perspective view of the proposed battery retainer means showing the battery member in phantom.
Figure 2:
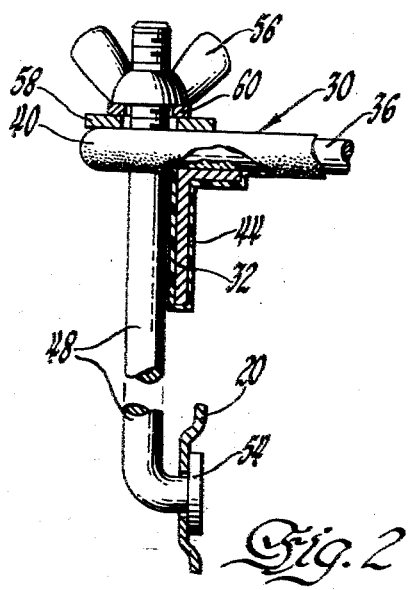
Figure 2 is a cross-sectional view of the proposed retainer means taken in the plane of line 2—2 of Figure 1 and looking in the direction of the arrows thereon.

A fragmentary section of an engine compartment, formed by walls 10 and 12, is shown in Figure 1. A battery receiving tray member 14 which includes a sheet metal base 16, vertically extending ridge 18, and a supporting side wall 20, is secured within the engine compartment between walls 10 and 12 as by spot welding the flange 22 of supporting wall 20 to compartment wall 10 and applying fastener means (not shown) through apertures 24 in ridge 18 to compartment wall 12. The tray member is of such dimension as to receive a battery member 26, shown in phantom, upon the base 16 and within the ridge 18 defining the edge of the tray. The aperture 28 may be provided to drain off any water accidentally collecting on the tray member.

The proposed battery supporting means further includes a battery retainer assembly 30. A pair of right angle members 32 and 34 are spaced for engagement with the upper edges of the battery 26 and are secured to a rod 36 extended therebetween and across the top of the battery. The rod is spaced to lie between battery filler caps 38 as is shown and has its ends extended beyond the angle members 32 and 34, and the sides of the battery. The ends of rod 36 are bent back upon themselves and secured to the angle members to form looped portions 40 and 42.

The retainer assembly is coated with a non-conductive and non-corrosive material such as a rubber or plastic composition 44 for longer serviceable life and so as not to damage or interfere with the battery in holding it to the tray member. The holes 46 which are shown formed through one end of each angle member, facilitate the dip coating of the assembly.

Tie rod members 48 and 50 are adapted to secure the retainer assembly 30 to the tray 14 and to hold the battery 26 therebetween. The tray supporting side wall 20 and a small upright bracket 52 disposed oppositely thereof and secured to ridge 18, are each provided with apertures for receiving the lower ends of the tie rods which are formed with heads 54. The tie rods as extended through the wall 20 and bracket 52 are held in pivotal engagement by the headed ends 54.

The upper ends of the tie rods 48 and 50 are extended through the looped end portions 40 and 42 of rod 36 and are threaded to receive the wing nuts 56. A washer 58 and lock nut 60 complete the fastener assembly, and enable the battery retainer assembly 30 to be drawn towards the tray 14 with the battery 26 securely engaged therebetween.

What is claimed is:

1. Means for holding a battery member within a receiving tray and which includes a retainer assembly having separate elongated angle members spaced for engaging opposite edges of said battery member, a rod member secured transversely to said angle members between the ends thereof and extended therebetween, the ends of said rod member extending beyond said angle members and being formed therewith to provide closed looped end portions, and means received through said looped end portions for engaging said retainer assembly to said tray member and said battery member therebetween.

2. The means received through said looped end portions as provided for by claim 1 which includes tie rod members pivotally received by said tray and having the ends thereof extended through said looped end portions of said rod member for engaging said retainer assembly to said tray member and said battery member therebetween.

3. The means for holding a battery member within a receiving tray as provided for by claim 2 which further includes having at least that part of said retainer assembly engaged with said battery coated with a resilient non-conductive and non-corrosive material for protection of said battery and of said retainer from acids commonly used within said battery.

4. Battery retainer means including a tray member formed to receive a battery member thereon, a retainer member including elongated right angle members spaced to engage opposite edges of said battery member and having a rod member secured transversely thereto and extended therebetween, the ends of said rod member extending beyond said angle members and being bent back upon themselves and secured to said angle members to form closed loop portions at opposite ends of said retainer member, said loop portions extending beyond the saide edges of said battery member, and tie rod members engaged to said tray member and having the ends thereof extended through said loop portions, said ends of said tie rods being threaded to receive fastener means for drawing said retainer members towards said tray member and engaging said battery member therebetween.

References Cited in the file of this patent

UNITED STATES PATENTS

| | | |
|---|---|---|
| 1,218,056 | Cole | Mar. 6, 1917 |
| 1,705,381 | Snyder | Mar. 12, 1929 |
| 2,402,682 | Shriro et al. | June 25, 1946 |
| 2,613,755 | Newby et al. | Oct. 14, 1952 |